United States Patent
Portisch et al.

(10) Patent No.: US 10,756,641 B2
(45) Date of Patent: Aug. 25, 2020

(54) SWITCH MODE POWER SUPPLY AND METHOD FOR OPERATING THE SWITCH MODE POWER SUPPLY

(75) Inventors: Daniel Portisch, Kleinhadersdorf (AT); Hans Drescher, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/234,948

(22) PCT Filed: May 15, 2012

(86) PCT No.: PCT/EP2012/059009
§ 371 (c)(1),
(2), (4) Date: Jan. 24, 2014

(87) PCT Pub. No.: WO2013/013850
PCT Pub. Date: Jan. 31, 2013

(65) Prior Publication Data
US 2014/0140110 A1 May 22, 2014

(30) Foreign Application Priority Data
Jul. 26, 2011 (EP) .................................. 11175353

(51) Int. Cl.
*H02M 5/44* (2006.01)
*H02M 5/458* (2006.01)
(Continued)

(52) U.S. Cl.
CPC ............. *H02M 5/44* (2013.01); *H02M 5/458* (2013.01); *H02M 1/36* (2013.01); *H02M 2001/0006* (2013.01)

(58) Field of Classification Search
CPC ............ H02M 1/36; H02M 5/40; H02M 5/42; H02M 5/44; H02M 5/443; H02M 5/45;
(Continued)

(56) References Cited

U.S. PATENT DOCUMENTS

| | | | | |
|---|---|---|---|---|
| 4,520,437 A | * | 5/1985 | Boettcher, Jr. | H02M 7/53873 363/41 |
| 4,992,718 A | * | 2/1991 | Kumaki | 318/768 |
| 5,995,393 A | * | 11/1999 | Deierlein | 363/49 |
| 6,593,520 B2 | * | 7/2003 | Kondo et al. | 136/244 |
| 7,466,568 B2 | * | 12/2008 | Kasai et al. | 363/19 |
| 2007/0019444 A1 | * | 1/2007 | Kasai et al. | 363/19 |

(Continued)

FOREIGN PATENT DOCUMENTS

| | | |
|---|---|---|
| CN | 101436822 | 5/2009 |
| CN | 101790837 | 7/2010 |

(Continued)

OTHER PUBLICATIONS

Technical Datasheet FLEX-4; Semiconductor Circuits, Inc.; May 20, 2011.

*Primary Examiner* — Bryan R Perez
(74) *Attorney, Agent, or Firm* — Cozen O'Connor

(57) ABSTRACT

A switch mode power supply and method for operating the power supply and to the use of the same, wherein the switch mode power supply comprises a control for controlling a control element and is connected to a DC link of the converter, the switch mode power supply comprises a startup-delay such that control of the switch element is blocked until a predetermined start delay duration (T) has lapsed, where the start delay duration (T) is longer than the time span between DC link charging.

14 Claims, 3 Drawing Sheets

(51) Int. Cl.
*H02M 1/00* (2006.01)
*H02M 1/36* (2007.01)

(58) Field of Classification Search
CPC .... H02M 5/4505; H02M 5/451; H02M 5/452;
H02M 5/458; H02M 5/4585; H02M 7/42;
H02M 7/48; H02M 7/487; H02M 7/493;
H02M 7/501; H02M 7/4826; H02M 7/49;
H02M 7/4807; H02M 7/537; H02M
7/5387; H02M 7/533; H02M 7/53
USPC ... 363/49, 44, 40, 34, 35, 37, 38, 41, 56.03,
363/56.07, 56
See application file for complete search history.

(56) References Cited

U.S. PATENT DOCUMENTS

| | | |
|---|---|---|
| 2008/0111594 A1 | 5/2008 | Ito |
| 2010/0008119 A1* | 1/2010 | O'Brien ............ H01L 31/02021 363/132 |
| 2010/0091530 A1* | 4/2010 | Yoshida et al. ................ 363/49 |
| 2011/0038185 A1* | 2/2011 | Swamy .................. H02J 7/045 363/34 |
| 2011/0134664 A1* | 6/2011 | Berghegger ................... 363/49 |

FOREIGN PATENT DOCUMENTS

| | | |
|---|---|---|
| CN | 101903202 | 12/2010 |
| DE | 4425547 | 1/1995 |
| DE | 10159639 | 6/2003 |
| DE | 10254236 | 6/2004 |
| DE | 102007060893 | 6/2009 |

\* cited by examiner

SWITCH MODE POWER SUPPLY AND METHOD FOR OPERATING THE SWITCH MODE POWER SUPPLY

REFERENCE TO RELATED APPLICATIONS

This is a U.S. national stage of application No. PCT/EP2012/059009 filed 15 May 2012. Priority is claimed on European Application No. 11175353.9 filed 26 Jul. 2011, the content of which is incorporated herein by reference in its entirety.

BACKGROUND OF THE INVENTION

1. Field of the Invention

The invention relates to a switch mode power supply comprising a control for controlling a switch element and connected to a DC link of a converter, and a method for operating the switch mode power supply.

2. Description of the Related Art

Converters are used to connect loads, such as variable-speed machines, to a three-phase supply. In this case, a DC link is connected via a rectifier to the three-phase supply and the load is controlled from the DC link via a suitable bridge circuit. It is usual for the DC link voltage to be charged via a resistor, i.e., a PTC resistor, and an auxiliary contactor. This series circuit, comprising the resistor and auxiliary contactor, is shunted via a main contactor at 95% of the charge.

The charging of the DC link is usually checked by a monitoring circuit to detect the occurrence of a voltage sag. Such a voltage sag occurs if, for example, beyond a specific voltage, a load is erroneously short-circuited. The converter controller therefore switches into a fault mode as soon as a voltage sag is detected.

Power supplies that are connected to such a DC link of a converter have to take these conditions into account. In conventional circuits, a representative arrangement includes a signaling device for signaling to the power supply that a DC link charging process is completed or more or less completed. Only then does the power supply switch on, and this prevents the monitoring circuit from detecting the switching-on of the power supply as a faulty voltage sag. However, the disadvantage here is the additional cable outlay and the fact that the input lines have to be suitably protected against interference.

SUMMARY OF THE INVENTION

It is therefore an object of the invention to provide an improved switch mode power supply and to provide a method for operating the switch mode power supply.

These and other objects and advantages are achieved in accordance with the invention by providing a switch mode power supply with a start-up delay, so that the control of the switch element is blocked until a predetermined start delay period has elapsed. Here, the start delay period is longer than the time interval for charging the DC link. The DC link charging operations usually last approximately 3 to 6 seconds. The effect of a sufficiently long start delay period of 10 seconds, for example, is that the switch mode power supply always only begins to cycle if the DC link charging has ended or at least progressed until a minor voltage sag resulting from the start-up of the switch mode power supply is not detected as a malfunction.

Provision is made in a further embodiment for the switch mode power supply to a have a switching circuit for detecting a voltage rise at the input side, and for a blocking circuit to block the control of the switch element during the start delay period. The desired function of a start delay of the switch mode power supply is therefore implemented in a simple manner.

It is advantageous if the switch mode power supply includes a DIP switch for activating the start-up delay. A switch mode power supply configured in this way has universal application. In accordance with the given operating conditions, the start-up delay function may be activated or de-activated via DIP switches.

It is also advantageous if the start delay period can be adjusted with the aid of operating means of the switch mode power supply. The switch mode power supply can be adapted in this way to different converter DC links. For converters that require a shorter period for charging the DC link, the start delay period is shortened so that the supply voltage delivered by the switch mode power supply is available quicker.

This can be simply achieved by providing the switch mode power supply with a function switch for adjusting the start delay period. In an embodiment, the DIP switch comprise a function switch for adjusting the start delay period.

More conveniently, the switch element also includes a signaling element for adjusting the start delay period. Here, a light element or a tone generator enables the set start delay period to be output in a simple manner.

In accordance with the invention, provision is made for the switch mode power supply to be used to supply a control of the converter. It is generally advantageous if the switch mode power supply is used to supply the converter and/or its peripherals.

It is also an object to provide a method for operating an appropriate switch mode power supply in which a threshold value of a DC link voltage is provided at the input-side of the switch mode power supply and detected so that the start delay period commences after the threshold value is reached, and so that control of a switch element is blocked until expiration of the start delay period. The switch mode power supply needs no further signals to detect the expiration of a DC link charging process.

For the adjustment of a modified start delay period, it is advantageous if a programming mode is activated via a function switch, during which programming mode a signaling element outputs repeated signals to indicate the start delay period to be set, and if the start delay period is determined by renewed actuation of the function switch. Such an adjustment process can be realized with simple operating elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of examples with reference to the attached figures, in which.

DETAILED DESCRIPTION OF THE PREFERRED EMBODIMENTS

Figure 1:
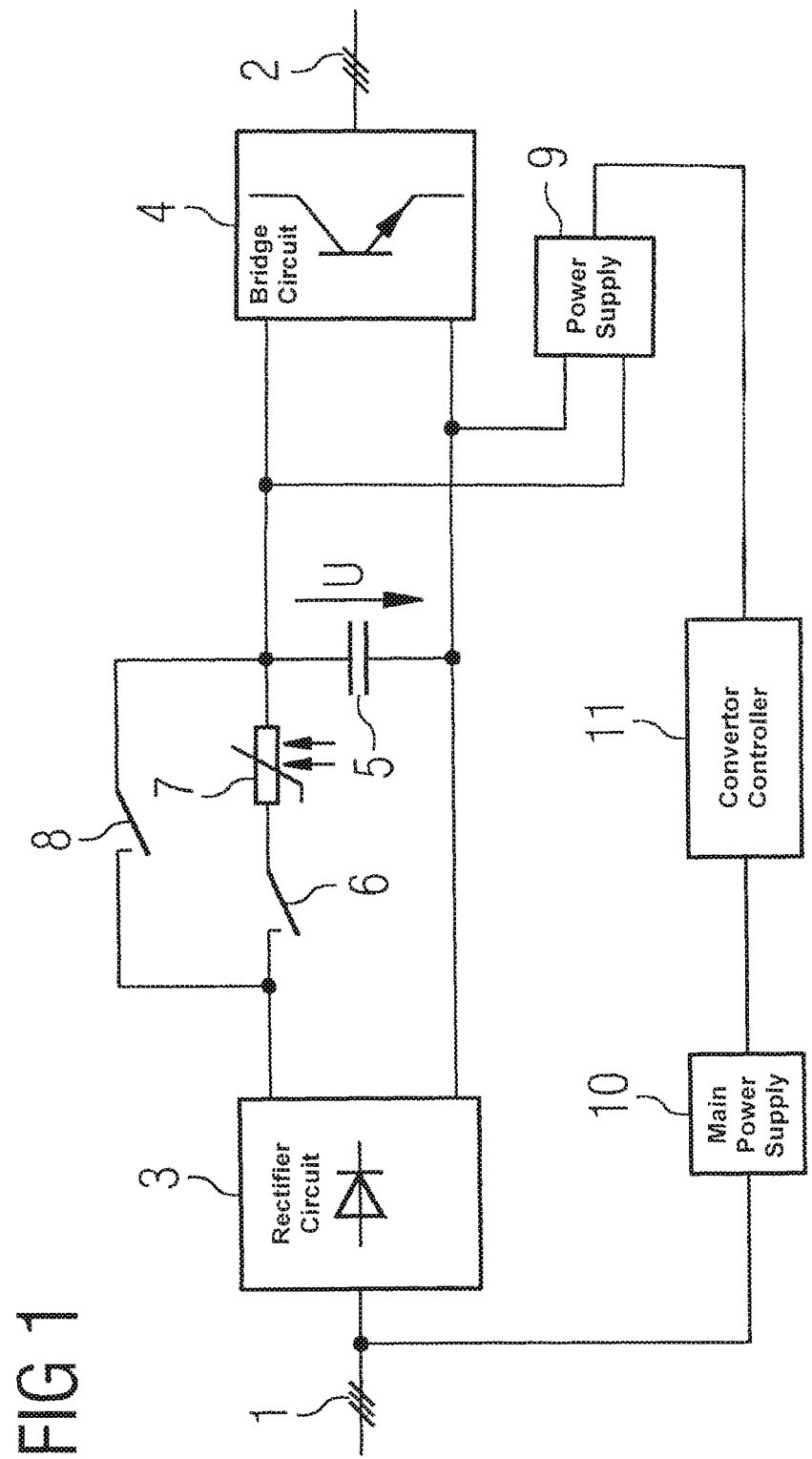
FIG. 1 a schematic block diagram of a converter circuit in accordance with the invention.

A converter circuit is illustrated in FIG. 1. Here, inventive switch mode power supply 9 is connected to a DC link voltage U which is applied to a DC link capacitor 5. The DC link is fed via a rectifier circuit 3 that is connected to a three-phase power supply 1. A three-phase output terminal 2 for connecting a three-phase machine is connected via a bridge circuit 4 to the DC link.

An exemplary charging circuit for the DC link consists of a resistor 7 (e.g., a PTC resistor) and a series-connected auxiliary contactor 6. As soon as a specific charge, such as 95% of the nominal DC link voltage U1, is reached, the resistor 7 and the auxiliary contactor 6 are shunted by a main contactor 8. An isolating transformer, a step-down converter or an active rectifier for slow clocking rate can be used as alternate charging circuits, for example.

The charging of a DC link is usually monitored via a monitoring circuit. The converter goes into a fault mode as soon as a negative voltage change (−du/dt) is detected during a charging phase.

The switch mode power supply 9 is used to supply a converter controller 11, which is connected in parallel to the switch mode power supply 9 and directly to the supply system 1 via a main power supply 10. In normal operation, the supply is realized via the main power supply 10. The switch mode power supply 9 connected to the DC link takes over the supply in the event of power failures. In this case, the energy stored in the DC link determines the duration of a power failure that is able to be bridged.

Figure 2:
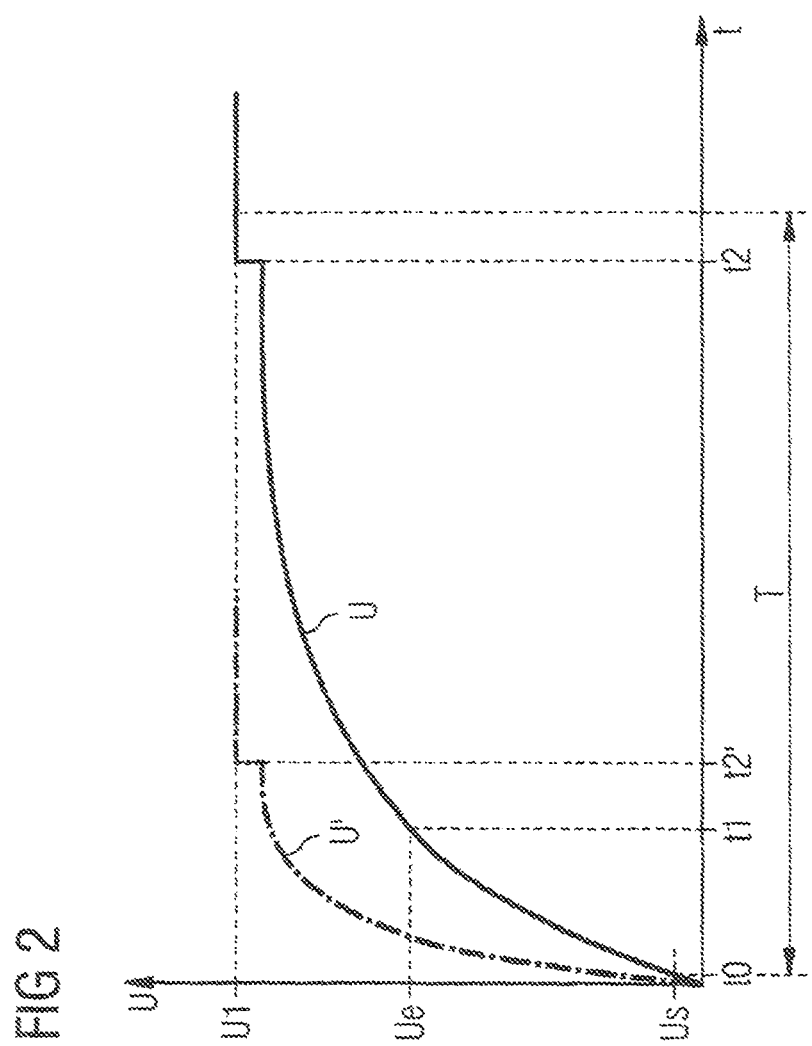
FIG. 2 is a graphical plot of waveforms of a DC link voltage.

FIG. 2 shows the voltage rise of a DC link voltage U during the charging phase. The voltage U rises to time t2 at which 95% the nominal DC link voltage is reached, for example. The resistor 7 and the auxiliary contactor 6 are then shunted by the main contactor 8. A conventional switch mode power supply 9 would be active during the charging phase up to time t1, whereupon triggering of the monitoring circuit would result in a malfunction.

The switch mode power supply 9 in accordance with the invention blocks the control of a switch element arranged in the switch mode power supply 9 until the DC link is charged up. A voltage drop caused by the inrush current of the switch mode power supply 9 is delayed, so that no converter malfunction occurs.

The switch mode power supply 9 includes a DIP switch, for example, for activating this inventive start-up delay. Such a switch mode power supply 9 is suitable for connection to converter DC links and to other supply sources, without the described ramp-up problem. Upon activation of the start-up delay, a preset start delay period T (e.g., 10 seconds) starts to run as soon as the DC link voltage U reaches a specified threshold value Us at time t0. Here, the threshold value Us is, on the one hand, less than the ON threshold Ue at time t1 at which, without a start-up delay, the switch mode power supply 9 would usually begin to cycle. On the other hand, the threshold value Us is made sufficiently high so that charging of the DC link is reliably detected.

In order to indicate the function of the switch mode power supply 9 to operating personnel, it is useful if the expiration of the start delay period T is signaled, such as via a flashing light-emitting diode.

The duration of a charging phase usually depends on the size of the converter. Small converters having a relatively small DC link capacitance 5 reach the rated DC link voltage U1 even sooner. Here, the rise in the DC link voltage U' is steeper than in larger converters.

Advantageously, the start delay period T is adjustable to adapt the switch mode power supply 9 to the charging period of different converters. Smaller converters are then available sooner. A better range for the start delay period T is between two and ten seconds.

Setting of the start delay period T is realized in a programming mode. The programming mode can be activated, for example, by actuating a function switch after the charging-up of the DC link voltage within a predefined activation time span. This function switch can also be the DIP switch for activating the start-up delay. The programming mode is then started by switching over the DIP switch to de-activation of the start-up delay function, following the charging phase. As soon as the device is in the programming mode, a signaling element, such as a light electrode, indicates the start delay period T to be set. A light-emitting diode flashes every second, for example. In order to set a six-second long start delay period T, for example, the light-emitting diode should flash six times before actuation of the function switch determines the start delay period T. If the function switch is formed by the DIP switch, the setting of the start delay period T is realized by switching over the DIP switch to activation of the start-up delay function.

The programming mode is automatically terminated after the start delay period T has been set and the device is started. This can be indicated to the operating personnel, such as by rapid flashing of the light-emitting diode. At the initial starting cycle following a change to the start delay period T, for verification it is useful if the new start delay period T is indicated via a signaling element. For example, the light-emitting diode flashes every second according to the number of set seconds.

It is better if the programming mode can also be activated when the switch mode power supply 9 is continuously operating, for example by switching over the function switch repeatedly.

Figure 3:
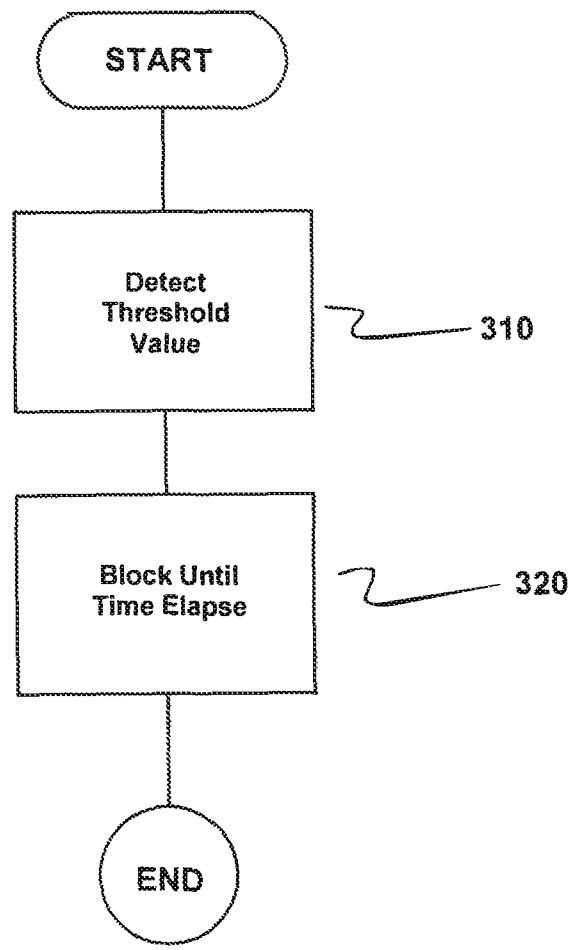
FIG. 3 is flowchart of the method in accordance with the invention.

FIG. 3 is a flowchart of a method for operating a switch mode power supply (9). The method comprises detecting a threshold value (Us) of a DC link voltage (U, U') applied to an input-side of the switch mode power supply (9) such that a predetermined start delay period (T) commences after the threshold value (Us) is reached, as indicated in step 310. A control of a switch element is then blocked until a predetermined start delay period (T) has elapsed, as indicated in step 320.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A switch mode power supply, comprising:
a switch element; and
a control for operative coupling to a DC link of a converter having a main contactor electrically connected to an auxiliary contactor which is electrically connected in series with a resistor, the control controlling the switch element and the switch mode power supply being electrically connected in parallel to a capacitor of the DC link;
wherein the switch mode power supply has a start-up delay such that control of the switch element is blocked during the start-up delay, after a DC link voltage, applied to an input-side of the switch mode power supply, at the DC link reaches a specified threshold value, and is blocked during the start-up delay until a predetermined start delay period (T), which is longer than a time interval for charging the DC link, has elapsed.

2. The switch mode power supply as claimed in claim 1, further comprising:
a switching circuit for detecting a voltage rise at an input side; and
a blocking circuit for blocking the control of the switch element during the predetermined start delay period (T).

3. The switch mode power supply as claimed in claim 2, wherein the switch mode power supply comprises a dual in-line package (DIP) switch for activating the predetermined start-up delay.

4. The switch mode power supply as claimed in claim 1, wherein the switch mode power supply comprises a dual in-line package (DIP) switch for activating the predetermined start-up delay.

5. The switch mode power supply as claimed in claim 1, wherein the predetermined start delay period (T) is adjustable via operating means of the switch mode power supply.

6. The switch mode power supply as claimed in claim 5, wherein the switch mode power supply comprises a function switch for setting the predetermined start delay period (T).

7. The switch mode power supply as claimed in claim 4, wherein the DIP switch comprises a function switch for setting the predetermined start delay period (T).

8. The switch mode power supply as claimed in claim 5, wherein the switch mode power supply comprises a signaling element for setting the predetermined start delay period (T).

9. The switch mode power supply as claimed in one of claim 1, wherein the switch mode power supply supplies a control of the converter.

10. The switch mode power supply as claimed in claim 1, wherein at least one of the converter and a peripheral of the converter is supplied by the switch mode power supply.

11. The switch mode power supply as claimed in claim 1, wherein the predetermined start delay period (T) is approximately 10 seconds.

12. A method for operating a switch mode power supply, comprising:
detecting a threshold value (Us) of a DC link voltage (U, U') applied to an input-side of the switch mode power supply at a DC link of a converter having a main contactor electrically connected to an auxiliary contactor which is electrically connected in series with a resistor such that a predetermined start delay period (T) commences after the threshold value (Us) is reached, the switch mode power supply being electrically connected in parallel to a capacitor of the DC link; and
blocking control of a switch element of the switch mode power supply after a voltage at the DC link reaches a specified threshold value after a start-up delay (t0) and until the predetermined start delay period (T), which is longer than a time interval for charging the DC link, has elapsed.

13. The method as claimed in claim 12, further comprising:
activating a programming mode via a function switch;
outputting repeated signals by a signaling element during the programming mode to indicate the predetermined start delay period (T) to be set, and
wherein the predetermined start delay period (T) is specified by renewed actuation of the function switch.

14. The method as claimed in claim 12, wherein the predetermined start delay period (T) is approximately 10 seconds.

* * * * *